United States Patent [19]

Propster et al.

[11] 4,432,780

[45] Feb. 21, 1984

[54] GLASS FIBER SCRAP RECLAMATION

[75] Inventors: Mark A. Propster, Gahanna; Charles M. Hohman; William L. Streicher, both of Granville, all of Ohio

[73] Assignee: Owens-Corning Fiberglas Corporation, Toledo, Ohio

[21] Appl. No.: 412,337

[22] Filed: Aug. 27, 1982

[51] Int. Cl.³ .............................................. C03B 5/16
[52] U.S. Cl. .................................... 65/2; 65/28; 65/134; 65/137; 65/335; 134/2
[58] Field of Search ............. 65/2, 28, 134, 137, 65/335

[56] References Cited

U.S. PATENT DOCUMENTS

| 3,343,935 | 9/1967 | Keefer et al. | 65/121 |
| 3,466,160 | 9/1969 | Keefer | 65/157 |
| 3,647,405 | 5/1972 | Smith | 65/181 |
| 3,852,108 | 12/1974 | Lindberg | 134/2 |
| 4,054,434 | 10/1977 | Thomas et al. | 65/134 |
| 4,065,282 | 12/1977 | Morey | 65/62 |
| 4,133,666 | 1/1979 | Rhodes | 65/121 |
| 4,145,202 | 3/1979 | Grodin et al. | 65/2 |
| 4,185,984 | 1/1980 | Kiyonaga | 65/135 |
| 4,309,204 | 1/1982 | Brooks | 65/28 |

OTHER PUBLICATIONS

Patent Application Ser. No. 357,496 filed Mar. 12, 1982 by William G. Wardlaw.

Primary Examiner—Robert L. Lindsay, Jr.
Attorney, Agent, or Firm—Ronald C. Hudgens; Philip R. Cloutier

[57] ABSTRACT

A method of reclaiming chemically coated glass scrap is disclosed. The scrap is introduced into the oxidizing atmosphere of a hydrocarbon-fuel fired glass melting furnace. Some of the glass is melted with the unmelted portion being melted with the glass batch as it moves through the furnace.

10 Claims, 2 Drawing Figures

4,432,780

GLASS FIBER SCRAP RECLAMATION

This invention relates to glass fiber scrap reclamation. In one of its more specific aspects this invention relates to a method of reclaiming scrap glass fibers by introducing the fibers into a glass melting furnace without the removal of binder from the fibers prior to the introduction.

BACKGROUND OF THE INVENTION

In the production of glass fiber products, such as glass fiber insulation and glass strands for reinforcement purposes, some scrap material is produced. This scrap comprises off-specification production, trimmings of insulation batts and the like.

This off-specification material has been disposed of in various ways but methods of reintroducing it into the process to recover the glass have been generally unsatisfactory. One principal difficulty arises due to a chemically-based binder or size which such scrap material has had applied to its surface during processing. When introduced directly into the glass batch, these surface coatings are difficult to burn off and their introduction into the molten glass affects the corrosion rate of the tank in which the molten glass is contained and changes the redox state of the glass. As a result of the latter, the radiant heat transfer characteristics of the furnace are adversely affected.

The method of this invention is directed to allowing the reintroduction of scrap glass into a glass melting furnace while avoiding these difficulties.

STATEMENT OF THE INVENTION

According to this invention there is provided a method for reclaiming chemically coated glass scrap in a glass batch melting furnace which comprises introducing the fibers in discrete form in an oxidizing gaseous stream into the hot oxidizing gases above a glass batch moving over the surface of melted glass within a glass melting furnace. At least a portion of the chemical coating on the surface of the glass scrap is oxidized. Some portion of the glass fibers accumulates on the unmelted glass batch. The unmelted glass batch and the accumulation of glass fibers are moved through the furnace to melt and commingle the glass fibers and the glass batch as molten glass.

DESCRIPTION OF THE INVENTION

Figure 1:
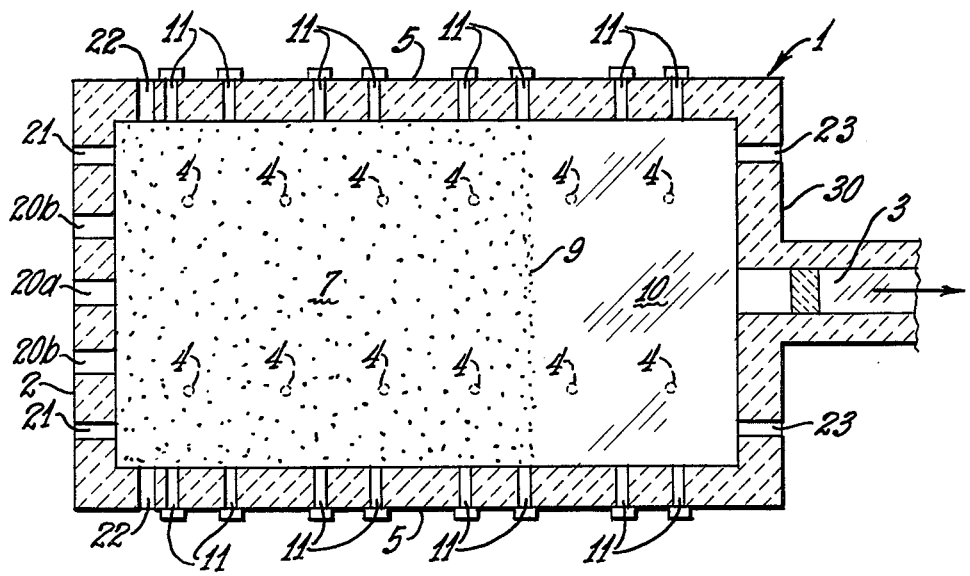
FIG. 1 is a plan view of a typical glass batch melting furnace.
Figure 2:
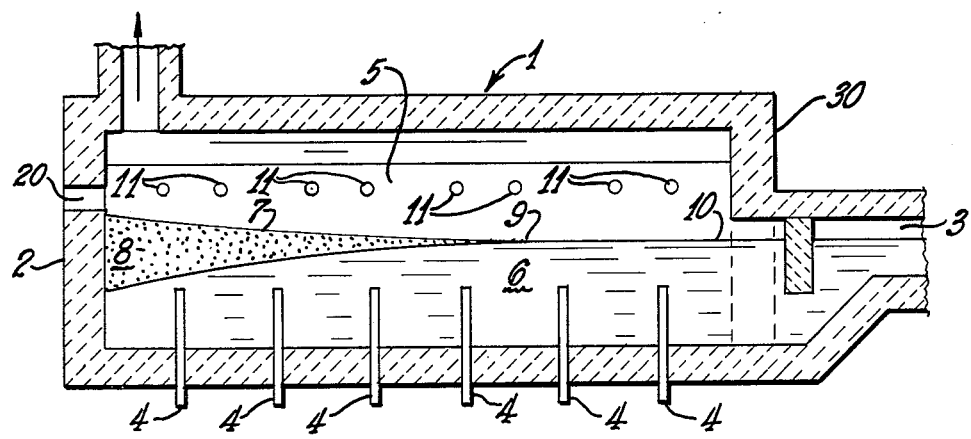
FIG. 2 is a view in elevation of a typical glass batch melting furnace.

The method of this invention is suitable for use in any gas fired furnace. It is particularly suitable for use in furnaces of the type discussed in U.S. Pat. No. 3,885,945 to Rees et al. A furnace of this type is depicted in FIGS. 1 and 2. Referring now to FIGS. 1 and 2, the aforementioned patent discusses a combination hydrocarbon fuel fired, electrode heated furnace 1 into which glass batch is charged through one or more introduction parts 20 in an upstream end wall 2 and molten glass is withdrawn through opening wall 3 in end wall 30. Electrodes 4 are positioned along the length of the furnace in one or more rows spaced from the longitudinal side walls 5 and from each other.

A pulverized glass batch is charged to the furnace in any suitable form and can include cullet. After its introduction, it floats on the molten glass mass 6 as a blanket 7 which is thickest in the region of introduction 8 and which tapers gradually to a leading edge of batch line 9 at its intersection with a molten glass upper surface 10 beyond which the molten glass is withdrawn from the furnace. The batch line is located about two-thirds the length of the furnace downstream from the locus of introduction of the batch.

The furnace will be equipped with hydrocarbon fuel-firing burners 11 along its sides. These burners discharge hot combustion gases above the glass batch and the molten glass in a direction perpendicular to the direction of flow of the glass through the furnace. These burners can be positioned in pairs along the sides with about six burners on each side being located upstream of the batch line and two burners on each side being located downstream of the batch line. In the usual operation of the furnace, only the latter two burners are employed with the remainder of the burners being used for auxiliary purposes. It is the burners downstream of the batch line which are principally employed in the method of this invention and it is principally into the hot combustion gases at and from these burners that the glass and oxidizing gases are projected.

The method of this invention is applicable to all types of glass fiber scrap regardless of the density thereof and the amount of chemical coating thereon. The invention has been employed using both high and low density glass fiber scrap having up to about 15% LOI.

The scrap glass can be introduced into the furnace in any suitable form. Preferably, it will be introduced in particulate form up to about 1¼ inch screen size by means of a blowing wool machine, one or more machines being used depending upon the quantity of scrap glass being introduced.

The scrap glass can be introduced in any suitable gaseous carrier. Preferably, it will be introduced in a gaseous oxidizing stream, such as air, the air being supplied in an amount sufficient to transport the scrap glass into the hot combustion gases above the batch charge and to provide oxygen for the oxidation of the surface coating. Generally, air to scrap glass ratios of preferably about 10 to about 35 cubic feet of air per pound of glass scrap are satisfactory. Sufficient air should be present in the combustion space above the melter surface to enable complete oxidation of the binder contained on the surface of the scrap glass, with some excess air being present. The air-glass mixture is introduced at a velocity of from about 15 to about 25 feet per second or at any velocity, depending upon the locus of introduction, sufficient to carry the air-glass mixture into intimate mixing with the hot combustion gases proximate their locus of production at the burner, that is, at a locus which exposes the glass to oxidation by the combusting gases for a sufficient time to oxidize at least a portion of the chemical coating from the surface of the glass.

The air-glass mixture can be introduced into the furnace at any suitable locus which allows the above described mixing with the combustion gases from the burners. The locus of introduction will determine the quantity of glass which can be successfully introduced.

The air-scrap glass mixture can be introduced through one or more entrance parts positioned in the upstream end wall 2 of the furnace. Preferably, it will be introduced through either ports 21 positioned between the longitudinal sidewalls of the furnace and the batch introduction parts 20, one of which, 20a, can be employed to introduce cullet and two of which, 20b, can be employed to introduce powdered batch. Employing this method of introduction, the amount of scrap glass which can be satisfactorily introduced is up to about 5 weight percent of the total glass pull from the furnace.

The air-scrap glass mixture can be introduced through one or more entrance ports 22 positioned in the longitudinal sidewalls 5 of the furnace. Preferably, it will be introduced through one port opening through each of the sidewalls, the ports being oppositely positioned from about two to about six feet from the upstream end wall. Employing this method of introduction, the amount of scrap glass which can be satisfactorily introduced is between about 2 to 3 weight percent of the total glass pull from the furnace.

The air-scrap glass mixture can be introduced through one or more entrance ports in the downstream end wall of the furnace. Preferably, it will be introduced through one or more peephole ports 23 positioned between the longitudinal side walls of the furnace. Employing this method of introduction, the amount of scrap glass which can be satisfactorily introduced is up to about 15 weight percent of the total glass pull from the furnace.

The air-scrap glass mixture can be introduced into the furnace through any suitable means. Preferably, it will be introduced through an expanding nozzle, for example, a nozzle expanding to about six inches in diameter affixed to a three inch introductory conduit.

As stated above, the glass will preferably be introduced into the hot combustion or oxidation gases from the burner. Some accumulation of the scrap glass on the unmelted batch will occur. This accumulation will, however, be melted to molten glass by the time it reaches the batch line.

The method of this invention is further illustrated by the following example.

A dual heat input furnace, that is, surface gas firing and underglass electric firing, was employed. Coarsely ground 1¼ inch screen, chemically coated scrap having a 15 percent LOI was fed into the furnace. The scrap had been ground in a hammer mill.

Cullet was introduced between the two batch entry points and an air-scrap glass mixture was introduced through a peephole in a downstream portion of the longitudinal side wall. The initial rate of scrap glass introduction was 260 pounds per hour, the rate being increased to 325 pounds of scrap glass per hour without increasing the energy input into the furnace. Air rates under all conditions were within the range of from about 150 to about 175 CFM.

Glass samples were taken during and for three days after the trial. Analysis of these samples showed that the scrap addition had been between 1 and 3 weight percent of the glass pull and that there had been only a slight increase in the ferrous-ferric ratio, which is a measure of the glass redox state. The glass had a 0.4 to 0.5 ratio prior to the scrap glass addition and increased only to 0.5 to 0.6 due to the scrap addition.

The above data demonstrates that the method of this invention provides for the satisfactory reclamation of chemically coated scrap glass fibers without adverse effect upon the glass contents of the furnace into which the scrap is introduced.

It will be evident from the foregoing that various modifications can be made to the method of this invention. Such, however, are considered within the scope of the invention.

We claim:

1. A method of processing chemically-coated glass fibers which comprises introducing the fibers in discrete form in an oxidizing gaseous stream the stream being supplied in an amount sufficient to transport the coated glass fibers into hot oxidizing gases above the glass batch within a glass melting furnace to oxidize at least a portion of the chemical coating from the surface of the fibers, accumulating some portion of the glass fibers on said unmelted batch and moving said portion of the glass fibers and said unmelted batch through said furnace to melt the fibers and commingle the melted fibers and the melted batch as molten glass.

2. The method of claim 1 in which said glass fibers are introduced into said furnace through the upstream end wall of said furnace.

3. The method of claim 1 in which said glass fibers are introduced into said furnace through the longitudinal side walls of said furnace.

4. The method of claim 1 in which said glass fibers are introduced into said furnace through the downstream end wall of said furnace.

5. The method of claim 1 in which said glass fibers are introduced into said furnace as a mixture comprising air.

6. The method of claim 5 in which said mixture comprises from about 10 to about 35 cubic feet of air per pound of glass fibers.

7. The method of claim 1 in which said glass fibers are introduced at a velocity of about 15 to about 25 feet per second.

8. The method of claim 1 in which said glass fibers are introduced in an amount up to about 15 weight percent of the total glass pull from said furnace.

9. The method of claim 1 in which cullet is introduced into said furnace.

10. The method of claim 1 in which pulverized glass batch and cullet are introduced into said furnace.

* * * * *